June 4, 1935. L. T. MART 2,003,547

FORCED DRAFT MULTIPLE FAN COOLING TOWER

Filed Oct. 21, 1933

Inventor
Leon T. Mart.
By
Thorper Thorpe
Attorneys

Patented June 4, 1935

2,003,547

UNITED STATES PATENT OFFICE 2,003,547

FORCED DRAFT MULTIPLE FAN COOLING TOWER

Leon T. Mart, Mission Township, Johnson County, Kans.

Application October 21, 1933, Serial No. 694,600

1 Claim. (Cl. 261—109)

This invention relates to cooling towers and has for its general object to produce a cooling tower of simple and efficient design, in which there are relatively no obstructions within the tower to cut down the velocity of the air travel and wherein there are no pockets of relatively dead or locally circulating air.

In standard multiple fan forced draft towers it has been common to provide wood filling or other means to act as a pressure chamber and to break up the liquid to insure even distribution of the air travelling through the tower and proper cooling of the liquid, but such means cuts down the air velocity and creates a back pressure on the fans which makes it necessary to use fans of larger size than would otherwise be required.

In the present invention, the tower is unobstructed throughout its height, and the fans on the opposite sides of the tower are staggered so that the air delivered from the fans at opposite sides of the tower do not come into opposition. Thus, the entire cross sectional area of the tower is subjected to the direct action of a fan, as distinguished from a standard tower where there is an area between adjacent fans in which the air is subjected to local circulation only or is relatively stagnant or dead.

Another object of the invention is to combine with the fan delivery arrangement mentioned, a liquid atomizing means adjacent the top of the tower whereby the liquid as initially delivered is in a finely divided and atomized condition which is essential for most efficient cooling.

With the general objects named in view, and others as will hereinafter appear; the invention consists in certain novel and useful features of construction and organization of parts as hereinafter described and claimed; and in order that it may be fully understood, reference is to be had to the accompanying drawing, in which:—

Figures 1, 2:
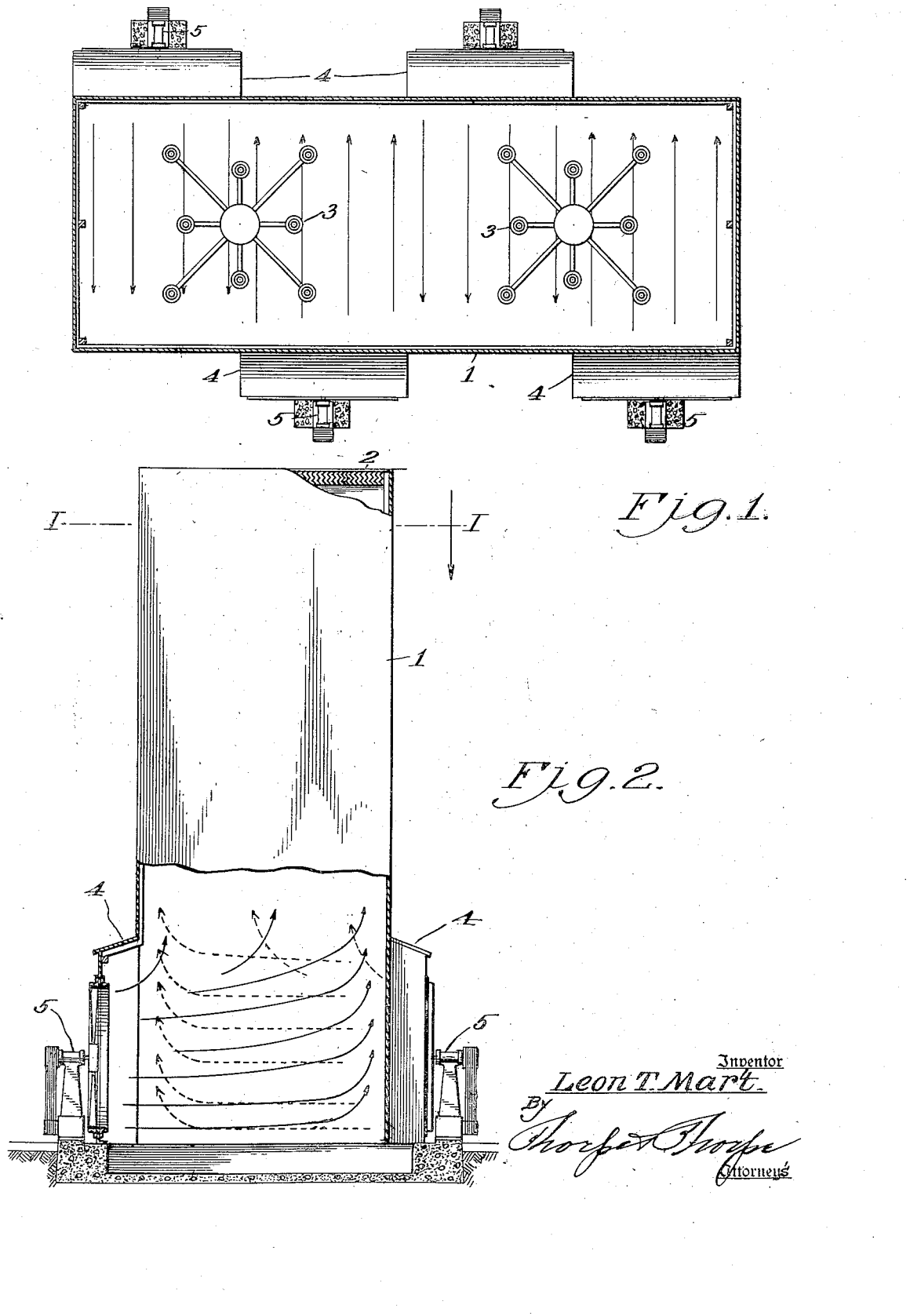
Figure 1 is a horizontal section on the line I—I of Figure 2 of a forced draft cooling tower embodying the invention.
Figure 2 is a side elevation, partially in section, of the tower shown in Figure 1.

In the said drawing, where like reference characters identify corresponding parts in all of the figures, 1 indicates a forced draft cooling tower, 2 is a suitable drift eliminator closing the upper end of the tower, and 3 are liquid spray nozzles arranged adjacent the upper end of the tower in such a fashion that the liquid is substantially equally distributed over the entire cross-sectional area of the tower. The spray nozzles are of that type which highly atomizes the liquid so that it is broken up most efficiently for cooling action.

The lower end of the tower is formed with a series of air intake openings arranged in staggered relation on opposite sides of the tower. In order to protect the fans from the weather and from the liquid falling within the tower, each fan opening is provided with an outwardly projecting housing 4 within which fans 5 are mounted.

The fans and housing are so staggered on opposite sides of the tower that the delivery of the fans on one side of the tower do not come into opposing conflict with the delivery of the fans on the opposite side of the tower. The delivery of the fans is indicated by the full line and broken line arrows in Figures 1 and 2. The delivery of each fan is thus free to travel upwardly unimpeded. On the other hand, if the fans are arranged in alinement on opposite sides of the tower, their deliveries come into direct opposition, which tends to increase the back pressure and also results in the formation of pockets of locally circulating or dead air between adjacent fans on the same side of the tower. The cooling efficiency of such a standard tower is therefore less than in a tower where all of the air is free to travel upwardly.

From the above description it will be apparent that I have produced a construction embodying all of the features of advantages set forth as desirable, and while I have described the preferred embodiment of the invention, it is to be understood that I reserve the right to make all changes within the spirit of the invention and without the ambit of the prior art.

I claim:—

A forced draft cooling tower comprising a vertical casing having a discharge opening at its upper end, liquid distributing devices within and adjacent the upper end of said tower, a series of spaced fans along one side of the tower and discharging in parallel planes transversely across the tower against its opposite side wall, and a second series of spaced fans on the opposite side of the tower from said first-named series of fans, said second fans discharging in planes parallel to the discharge of the first series and against the opposite side wall, the two series of fans being arranged so that no part of a fan blast will intercept the blast from an oppositely discharging fan.

LEON T. MART.